United States Patent [19]

Isogai

[11] Patent Number: 4,934,487

[45] Date of Patent: Jun. 19, 1990

[54] SYSTEM FOR LIFTING A VEHICLE FOR REPAIR THEREOF

[75] Inventor: Shunji Isogai, Hekinan, Japan

[73] Assignee: Sugiyasu Industries, Co., Ltd., Aichi, Japan

[21] Appl. No.: 144,521

[22] Filed: Jan. 15, 1988

[30] Foreign Application Priority Data

Sep. 4, 1987 [JP] Japan .......................... 62-136124[U]

[51] Int. Cl.[5] .............................................. B60S 13/00

[52] U.S. Cl. ................................ 187/8.67; 254/89 R; 187/8.41

[58] Field of Search .................... 187/8.67, 8.75, 8.41, 187/8.64, 8.65; 254/89 R

[56] References Cited

U.S. PATENT DOCUMENTS 4,679,660 7/1987 Suzuki ............................ 187/8.67 X
4,763,761 8/1988 McKinsey et al. ........... 254/89 R X
4,776,569 10/1988 Nestel-Eichhausen ........... 254/89 R

FOREIGN PATENT DOCUMENTS 2340349 2/1974 Fed. Rep. of Germany .... 254/89 R
2356069 6/1974 Fed. Rep. of Germany .... 254/89 R
2751085 6/1978 Fed. Rep. of Germany .... 254/89 R
2742518 3/1979 Fed. Rep. of Germany .... 254/89 R
2841022 4/1980 Fed. Rep. of Germany .... 254/89 R

*Primary Examiner*—Joseph J. Rolla
*Assistant Examiner*—Boris Milef
*Attorney, Agent, or Firm*—Lahive & Cockfield

[57] ABSTRACT

A vehicle lifting system includes a pair of parallel posts upstanding from a horizontal base and each having a rectangular cross section. A carriage is vertically movably supported on each post. Two swing arms, i.e. a long arm and a short arm, are horizontally rotatably supported on each carriage. Each arm has one end connected to the carriage, while the other end thereof is provided with a vehicle support. The posts define therebetween an open space in which a vehicle can be received to rest on the vehicle supports. Each carriage is supported on that side of the corresponding post which faces one side of the system through which the vehicle is moved forward thereinto, so that the open space and hence the system may have an effective width which is equal to the distance between the posts.

6 Claims, 5 Drawing Sheets

SYSTEM FOR LIFTING A VEHICLE FOR REPAIR THEREOF

BACKGROUND OF THE INVENTION

1. Field of the Invention:

This invention relates to a system of the two-post or arch-shaped construction for lifting a vehicle when repairing it. More specifically, it is a system in which a vehicle is supported on four swing arms and lifted when those arms are raised by a pair of vertically movable carriages along a pair of posts.

2. Description of the Prior Art:

Known vehicle lifting systems of the type to which this invention pertains are shown by way of example in FIGS. 2, 4(*a*) and 4(*b*) of the accompanying drawings. They comprise a pair of parallel posts 1*a* upstanding from a horizontal base and each having a rectangular cross section, a pair of carriages 2*b* each supported vertically movably on one of the posts, and two swing arms 4 supported horizontally rotatably on each of the carriages and each having one end connected to one of the carriages, while the other end thereof is provided with a vehicle support 5. The posts 1*a* are spaced apart from each other and define therebetween an open space in which a vehicle can be received to rest on the vehicle supports 5 and be lifted. The system may or may not include a straight or curved top member spanning the posts and forming an arch-shaped structure.

When repairing the interior of a vehicle in its lifted position, it is necessary to open its doors as widely as possible in order to increase the efficiency of its repairing work. The posts 1*a* or the carriages 2*b*, however, limit the degree to which the doors 6*a* of a motor vehicle M can be opened. There are known a system in which the posts 1*a* have a longer distance therebetween, as shown in FIG. 4(*a*), and a system in which the posts 1*a* are positioned closer to the front end F of the vehicle M placed therebetween, as shown in FIG. 4(*b*). These systems improve the degree of opening of the doors 6*a* to some extent, but are still unsatisfactory for the reasons which will now be set forth. The former system requires a larger space for installation. In the latter system, the limited length of each swing arm 4 and the limited degree to which it is rotatable limit the positions of the posts 1*a* and do not permit the posts to be located in any position that is sufficiently close to the front end F of the vehicle M to allow its doors 6*a* to open fully.

SUMMARY OF THE INVENTION

Under these circumstances, it is an object of this invention to provide an improved vehicle lifting system which enables the doors of a vehicle mounted therein to open fully, while not requiring any larger space for installation.

This object is attained by a system comprising a pair of parallel posts upstanding from a horizontal base and each having a rectangular cross section, where a rectangle is defined to be a four-sided figure having four right angles, a pair of carriages each supported vertically movably on one of the posts, and two swing arms supported horizontally rotatably on each of the carriages and each having one end connected to one of the carriages, while the other end thereof is provided with a vehicle support, characterized in that each of the carriages is supported on that side of one of the posts which faces that side of the system through which a vehicle is introduced thereinto.

In the known systems, the carriages are supported on those sides of the respective posts which face each other, and the swing arms are connected to those sides of the carriages which face each other, as is obvious from FIGS. 2, 4(*a*) and 4(*b*). According to this invention, however, the carriages are supported on those sides of the respective posts which do not face each other, but face the rear side of the system through which a vehicle is introduced thereinto, and the swing arms are connected to those sides of the respective carriages which do not face each other, but face the rear side of the system. This arrangement makes it possible to position the posts in locations by far closer to the front end of the vehicle mounted therebetween and thereby open its doors by far more widely. Moreover, the posts have a longer effective distance therebetween, as neither of the carriages has any portion projecting inwardly or toward the vehicle. Therefore, the system of this invention facilitates the movement of the vehicle into and out of the system and improves the efficiency of its repairing work greatly.

BRIEF DESCRIPTION OF THE DRAWINGS

FIG. 4(*b*) is a view similar to FIG. 4(*a*), but showing a modified form of the known system;

DETAILED DESCRIPTION OF THE INVENTION

Figure 1:
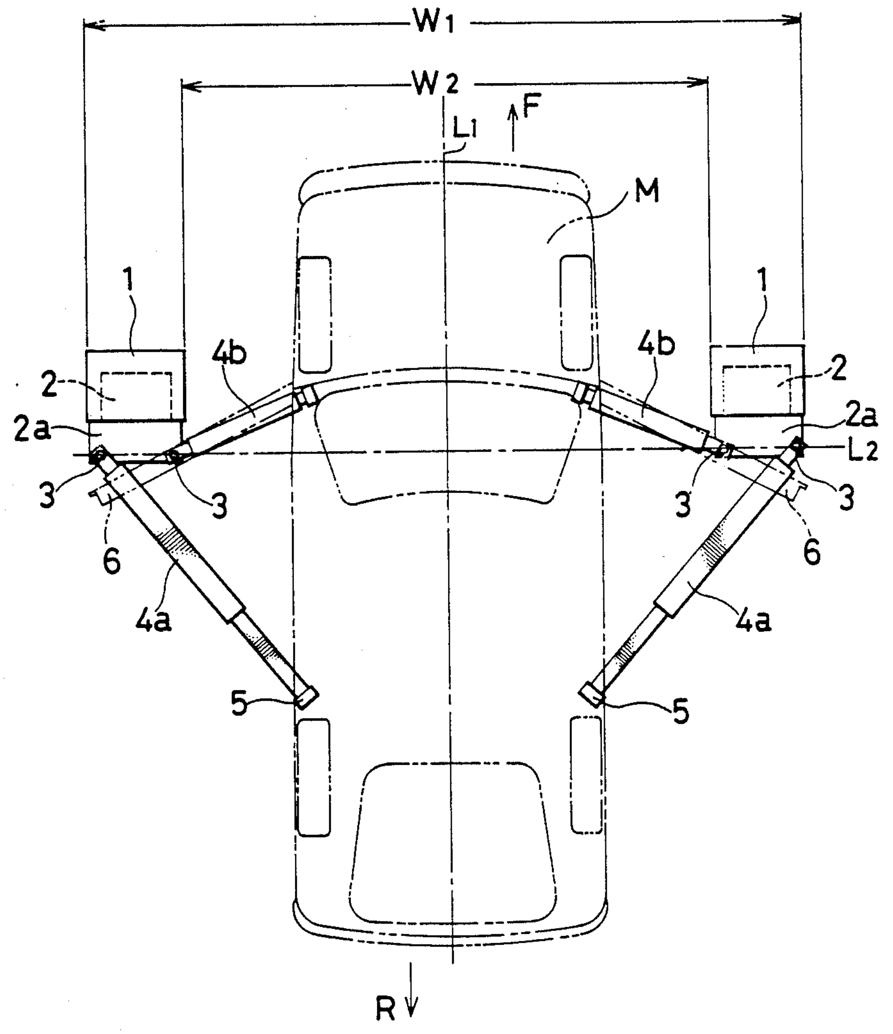
FIG. 1 is a partly omitted top plan view of a system embodying this invention.
Figure 2:
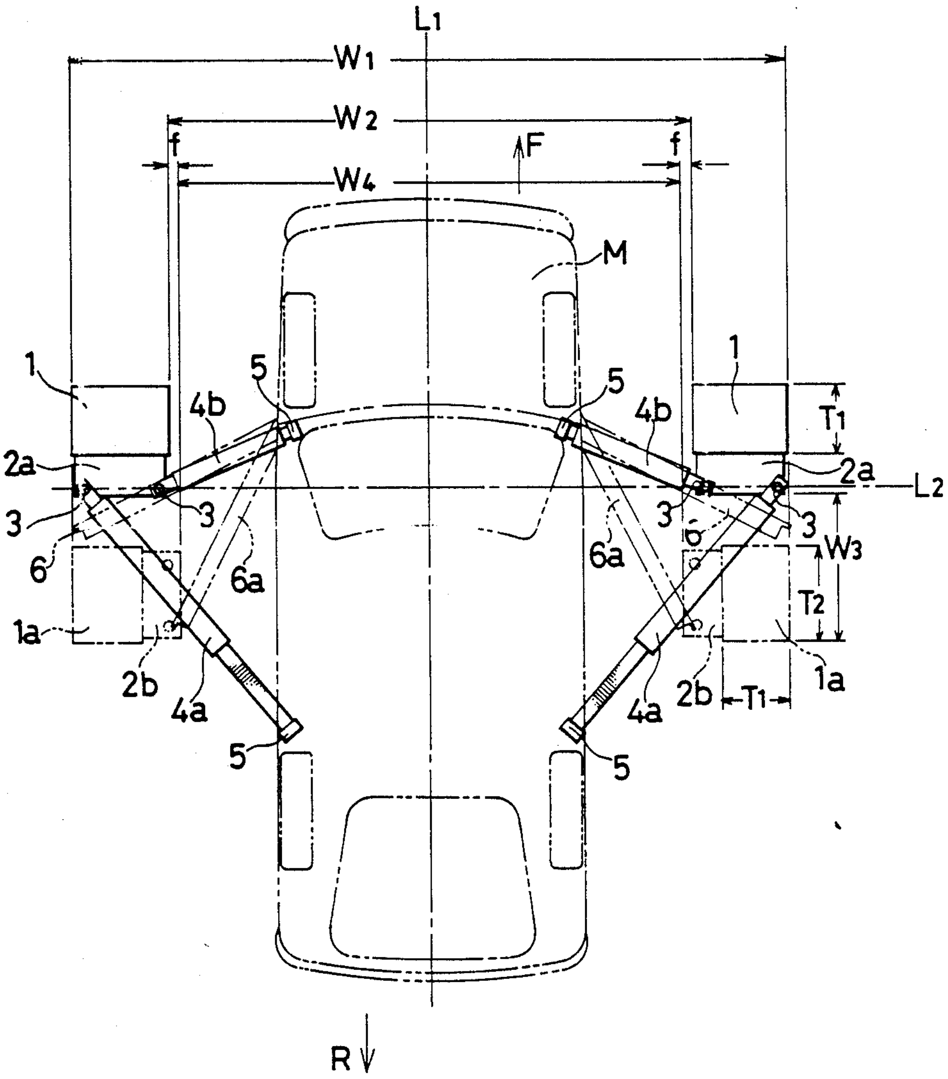
FIG. 2 is a partly omitted top plan view showing the system of this invention, as well as the known system, to compare them with respect to the positions of the posts.
Figure 3:
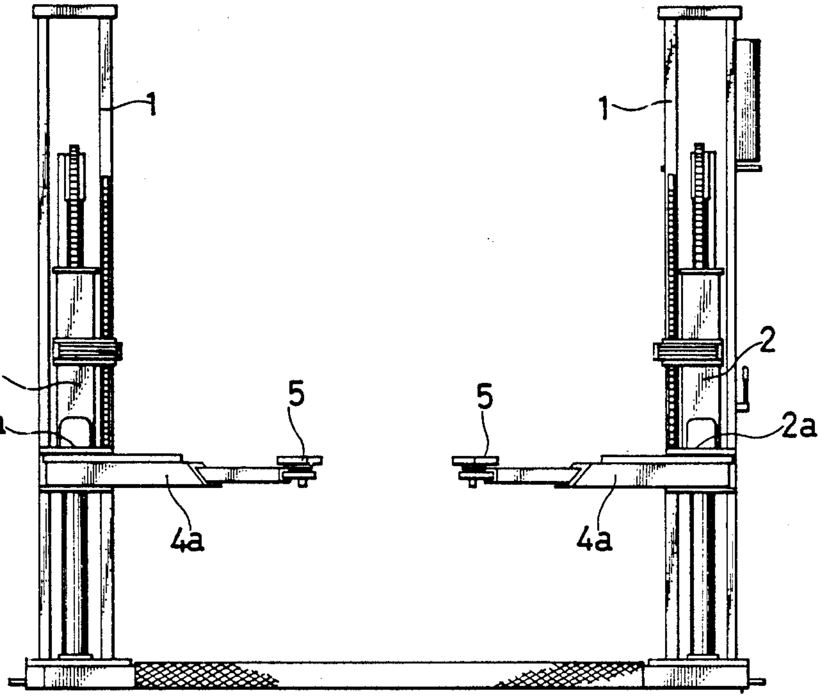
FIG. 3 is a front elevational view of the two-post system embodying this invention.
Figure 4:
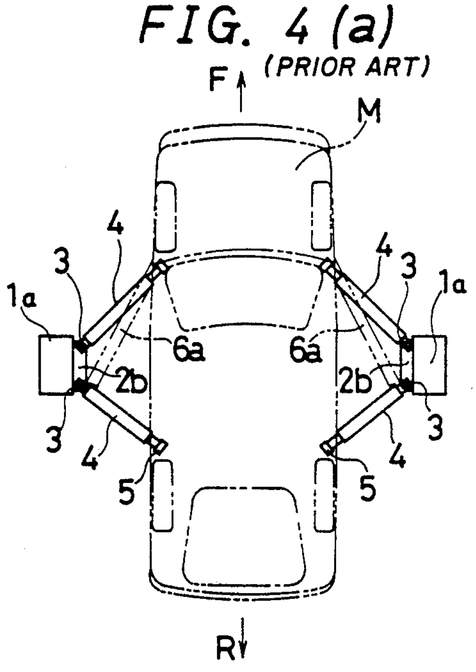
FIG. 4 (a) (PRIOR ART)
FIG. 4(*a*) is a partly omitted top plan view of the known system.
Figure 4:
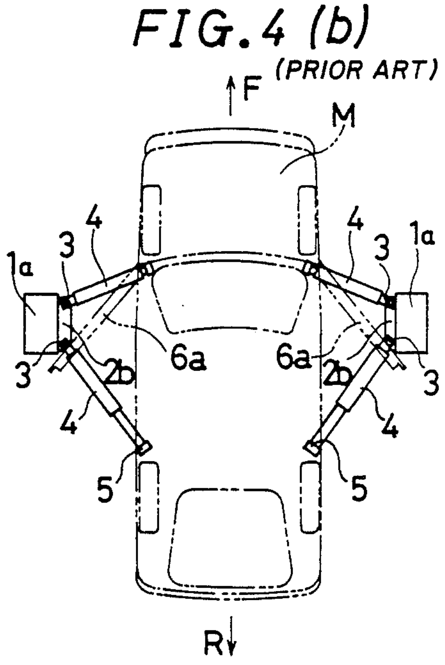
FIG. 4 (b) (PRIOR ART)

A vehicle lifting system of the two-post type embodying this invention is shown by way of example in FIGS. 1 to 3. Like numerals are used to indicate like parts throughout FIGS. 1 to 3 and FIGS. 4(*a*) and 4(*b*), so that no repeated description of what has hereinbefore been stated in connection with the prior art may be necessary. The system comprises a pair of parallel posts 1 upstanding from a horizontal base and spaced apart from each other to define therebetween an open space in which a vehicle can be received. Each post 1 has a rectangular cross section in the sense that it is not a square and is a four-sided figure having four right angles. However, its cross sectional shape can alternatively be a square.

A carriage 2 is supported on each post 1 and is vertically movable along it. The carriages 2 are simultaneously movable by known driving mechanisms, such as hydraulic cylinders and chains, provided in the posts 1. Each carriage 2 is supported on that side of the corresponding post 1 which faces the rear side of the system, and has a projecting portion 2*a* which also faces the rear side of the system.

Two swing arms 4a and 4b are horizontally rotatably supported on each carriage 2, or more specifically, on its projecting portion 2a. The arm 4a is longer than the arm 4b. Each arm has one end connected to the projecting carriage portion 2a by a pin 3 about which it is rotatable. Each arm is connected to that side of the corresponding carriage portion 2a which faces the rear side of the system. Each of the arms 4a and 4b is of the telescopic construction and can be held in any expanded or contracted position. It is provided at the other end thereof remote from the pin 3 with a vehicle support 5 on which a motor vehicle M can rest.

The system is transversely symmetric with respect to its longitudinal axis $L_1$ on which the vehicle M mounted therein is positioned. The pins 3, about which the four swing arms 4a and 4b are respectively rotatable, are all located on a straight line $L_2$ which is substantially perpendicular to the longitudinal axis $L_1$ of the system.

The posts 1, including the corresponding carriage portions, are located by far closer to the front side cf the system or the front end F of the vehicle M mounted therein than the posts 1a in the known system are, as is obvious from the distance shown at $W_3$ in FIG. 2. This arrangement enables the doors 6 of the vehicle M to open by far more widely and thereby greatly facilitates the work of repairing the interior of the vehicle M.

The distance $W_1$ between the outer sides of the posts 1, which is substantially equal to the overall width of the system, is equal to the corresponding dimension in the known system shown in FIG. 2. Therefore, the system of this invention does not require any larger space for installation than the known system. Nevertheless, it has an effective width $W_2$ between the posts 1 which is greater than the effective width $W_4$ of the known system, since no carriage portion projects from either of those sides of the posts 1 which face each other. Referring to FIG. 2, the width $W_2$ is greater than the width $W_4$ by a distance of 2 f $(W_2-W_4)$ which is due to the presence of the projecting carriage portions 2b in the known system. The greater width $W_2$ facilitates the movement of the vehicle into or out of the system and the work of repairing it.

The distance $W_3$, by which the posts 1 are shifted toward the front side of the system, can be further increased if the posts 1 are made of a material which is sufficiently strong to permit a reduction of their thickness $T_1$.

The length of the swing arms 4a depends on the distance $W_1$, and the degree to which the doors 6 can be opened depends on the thickness $T_1$ of the posts $T_1$, the thickness of the carriage portions 2a and the limitation imposed by the work of removing the front wheels of the vehicle or replacing them. If these factors are appropriately selected, therefore, the system of this invention allows the doors 6 to open to any desired degree within its unavoidable limit and is, therefore, useful for a wide variety of vehicles. For example, it is useful for a vehicle of the type in which the doors are hinged to its front end, such as a one-box car. It allows the doors to open fully without interfering with the posts or the carriages and facilitates any repairing work within the vehicle or around it.

The system of this invention also enables the more effective use of the space in the factory in which it is installed, as the posts can be located closer to the wall of the factory building.

Figure 5:
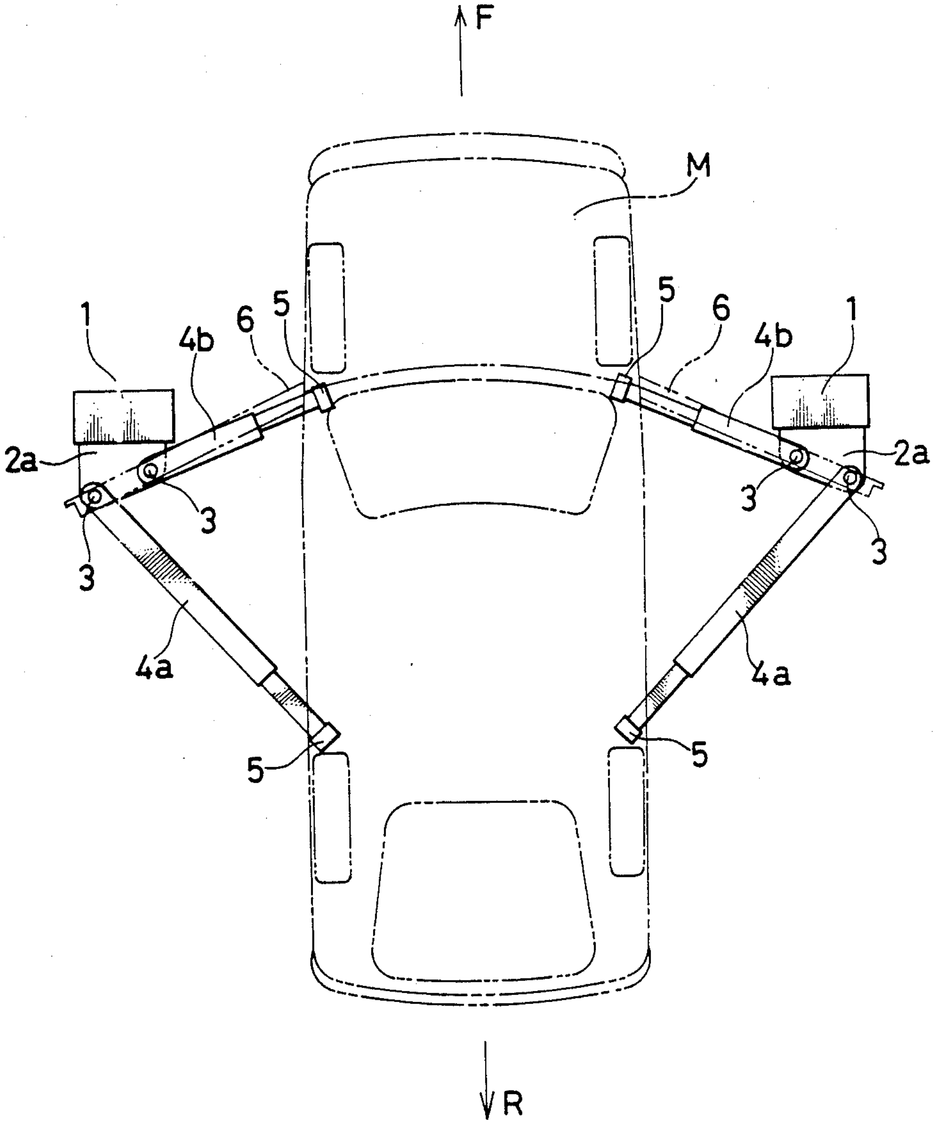
FIG. 5 is a view similar to FIG. 1, but showing a modified form of the system according to this invention.

Reference is now made to FIG. 5 showing a modified form of the system according to this invention. The system shown in FIG. 5 is identical in construction to that as hereinabove described with reference to FIGS. 1 to 3, except that the pins 3 are not located on a straight line. The pins 3 by which the long arms 4a are connected to the carriage portions 2a are located closer to the rear side of the system than the pins 3 by which the short arms 4b are connected thereto are, and the carriage portions 2a are naturally shaped differently from their counterparts in FIGS. 1 to 3. This arrangement provides a support of still higher stability for the vehicle, as is obvious from a standpoint of dynamics.

Figure 6:
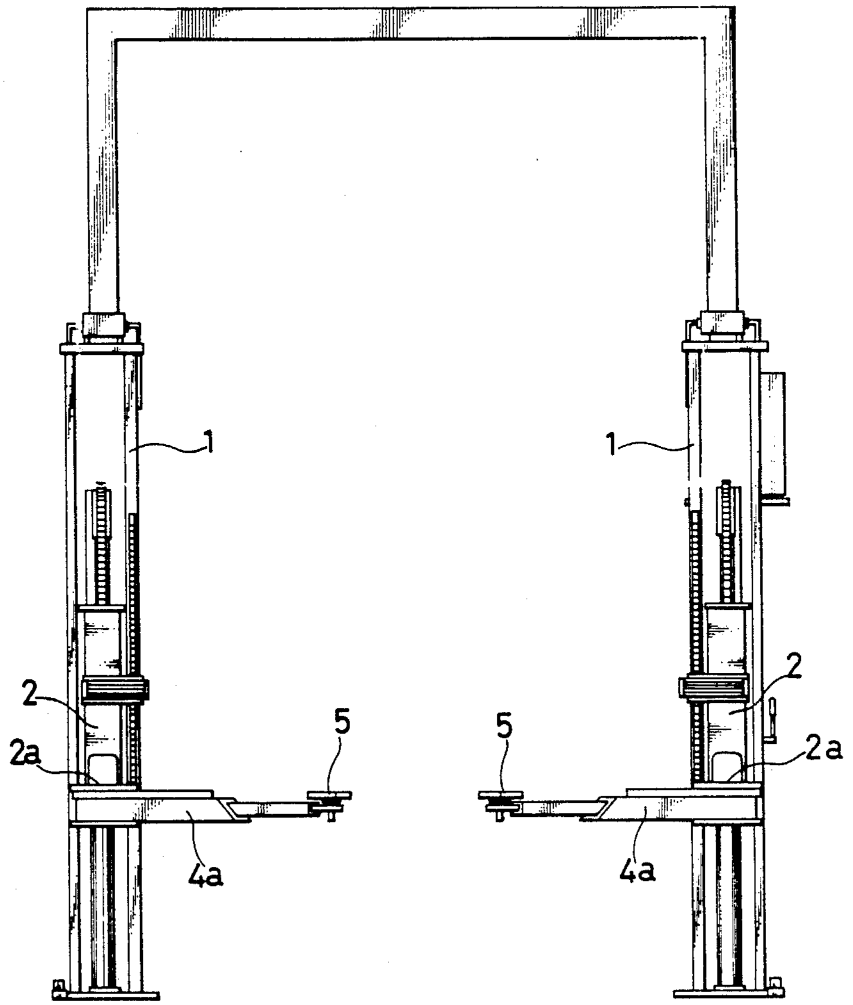
FIG. 6 is a front elevational view of an arch-shaped system according to another embodiment of this invention.

This invention is also applicable to an arch-shaped system, as is shown by way of example in FIG. 6. The term "arch-shaped" as herein used refers to any structure including a beam or any other additional member spanning the two posts at the tops thereof. No further description of the structure as shown in FIG. 6 is, therefore, believed to be necessary to anybody of ordinary skill in the art.

While the invention has been described with reference to the preferred embodiments thereof, it is to be understood that modifications or variations may be easily made by anybody of ordinary skill in the art without departing from the scope of this invention which is defined by the appended claims.

What is claimed is:

1. In a vehicle lifting system having a pair of parallel posts upstanding from a horizontal base, a pair of carriages, each of which is supported vertically movably on one of said posts, and two swing arms supported horizontally rotatably on each of said carriages and each arm having a connection end connected to one of said carriages while the other end thereof is provided with a vehicle support, said posts defining therebetween an open space in which a vehicle can be received to rest on said vehicle supports, the improvement comprising means on each carriage for providing rotatable supporting connection with each of said two swing arms at a location disposed outward from said open space and on a side of said post, on which that carriage is movable, facing transversely to the spacing between said posts, and wherein said means has no arm-supporting structure extending into said open space.

2. In a system as set forth in claim 1, the further improvement wherein said two arms consist of a long arm and a short arm, and said means for providing rotatable connection includes means connecting one end of said short arm to one of said carriages at a location disposed closer to said open space than the connection of said long arm to that carriage.

3. A system as set forth in claim 2, wherein said ends of said arms connected to said carriages are all located in a straight line which is substantially perpendicular to the longitudinal axis of the system from which said posts are equally spaced apart.

4. In a system as set forth in claim 2, the further improvement wherein said means for providing rotatable connection includes means connecting said short arms to said carriages at locations disposed closer to said posts than are said connection ends of said long arms.

5. In a system as set forth in claim 1, the further improvement wherein said each carriage has an arm-supporting portion projecting from said transversely-facing side of said one post, said arms being supported on said projecting portion.

6. In a vehicle lifting system having a pair of parallel posts upstanding from a horizontal base, a pair of carriages, each of which is supported vertically movably on one of said posts, and wherein said pair of posts is arranged for a vehicle to enter said open space therebetween, and two swing arms supported horizontally rotatably on each of said carriages and each arm having a connection end connected to one of said carriages while the other end thereof is provided with a vehicle support, said posts defining therebetween an open space in which a vehicle can be received to rest on said vehicle supports, the improvement comprising means on each carriage for providing rotatable supporting connection with each of said two swing arms at a location disposed outward from said open space and on a side of said post, on which that carriage is movable, facing transversely to the spacing between said posts, each said post has a rectangular cross-section and each said transversely-facing side of one of said post faces opposite to the direction from which a vehicle enters said open space.

* * * * *